(12) United States Patent
Chen et al.

(10) Patent No.: US 6,859,433 B1
(45) Date of Patent: Feb. 22, 2005

(54) RELAY CONTROL METHOD AND CIRCUIT WITH IMPROVED LOAD BALANCING CAPABILITY BASED ON USER-PREDEFINED PORT GROUP CONFIGURATION

(75) Inventors: Wei Pin Chen, Taipei (TW); Chung Yuan Chao, Taipei (TW)

(73) Assignee: Via Technologies, Inc., Taipei Hsien (TW)

( * ) Notice: Subject to any disclaimer, the term of this patent is extended or adjusted under 35 U.S.C. 154(b) by 713 days.

(21) Appl. No.: 09/711,838

(22) Filed: Nov. 13, 2000

(30) Foreign Application Priority Data

Jan. 15, 2000 (TW) .................................... 89100600 A

(51) Int. Cl.[7] .................................. H04L 12/26
(52) U.S. Cl. .................................... 370/230
(58) Field of Search ........................ 370/230, 230.1, 370/402

(56) References Cited

U.S. PATENT DOCUMENTS 6,018,526 A  * 1/2000 Liu et al. .................... 370/401
6,473,424 B1 * 10/2002 DeJager et al. ............. 370/389
6,614,758 B2 * 9/2003 Wong et al. ................. 370/232

* cited by examiner

*Primary Examiner*—Melvin Marcelo
(74) *Attorney, Agent, or Firm*—J.C. Patents

(57) ABSTRACT

A relay control method and circuit is designed for use on a computer network system, such as Ethernet, which can perform a load-balancing operation based on a port group configuration in such a manner as to allow an increased network data communication efficiency through an Ethernet Switch. In the invention, a CRC (Cyclic Redundancy Check) operation is performed on the binary address information extracted from each received frame to thereby obtain a CRC modulo. Based on the CRC modulo, the target port of the received data frame is found from a routing table. Then the received frame is forwarded according to the index address, the target port, and the port group configuration. The port group configuration can be adjusted if an over-loading is occurred in the ports belonging to a port group. This method and circuit is more advantageous to use than the prior art in that the number of ports in each group needs not be a 2's power as in the case of the prior art, and instead can be an arbitrary user-selected number no larger than the total number of the ports. Moreover, it can increase the overall network data communication efficiency through the Ethernet Switch device.

16 Claims, 4 Drawing Sheets

RELAY CONTROL METHOD AND CIRCUIT WITH IMPROVED LOAD BALANCING CAPABILITY BASED ON USER-PREDEFINED PORT GROUP CONFIGURATION

CROSS-REFERENCE TO RELATED APPLICATION

This application claims the priority benefit of Taiwan application serial no. 89100600, filed Jan. 15, 2000.

BACKGROUND OF THE INVENTION

1. Field of the Invention

This invention relates to computer network technology, and more particularly, to a relay control method and circuit with an improved load-balancing capability based on user-predefined port group configuration, which is designed for use on a computer network system, such as Ethernet, to allow an increased network data communication efficiency.

2. Description of Related Art

Although Ethernet is the most popular local area network, a transmission rate of 10Mbps (bit per second) is not enough for multimedia communication. Consequently, an improved solution, Fast Ethernet, which has a transmission rate of 100 Mbps, is developed. However, in fast Ethernet an additional convergence sublayer (CS) must be introduced between the media access control (MAC) sublayer and the physical medium dependent (PMD) sublayer. Hence, the network interface card must be updated by a fast Ethernet interface card. However, in the case of increasing the transmission rate without updating the original slow network interface card in each network station, an Ethernet switch structure is preferred.

In the conventional Ethernet, a twisted wires is used as a medium for network connection. It does not matter if the transmission rate is 10 Mbps or 100 Mbps, workstations and server are linked together through an Ethernet hub so that network data are shared. In general, bandwidth of the hub is shared by the linked workstations attached to the network. For example, for a 100 Mbps Ethernet hub with 16 ports, if 4 ports are connected to workstations, network bandwidth is shared by the 4 workstations. If 16 ports are connected to workstations, network bandwidth is shared by the 16 workstations. As the number of network users increases, network collision will become more serious and bandwidth assigned to each user will be narrower as well. Hence, conventional Ethernet hub is no longer capable of satisfying the demands of users.

An Ethernet switch is developed for improving network bandwidth. The Ethernet switch permits the simultaneous data transmission of several connected workstations so that overall performance of the network is increased. To achieve the switching function, the Ethernet switch must know which port a workstation is connected to. In other words, the Ethernet switch must have an address learning function similar to a bridge device. When the switch receives a frame signal, a routing table will be consulted to lookup for the port connected to the destination workstation. If the port is found, a control processor will send out a control signal to a switching element so that the frame signal is output to the port. Conversely, if the port is not found in the routing table, the frame signal will be broadcast to every connected port so that the destination workstation is sure to receive the frame.

Assume that N is the number of connection ports in an Ethernet switch, the switch is capable of transmitting frame signal to a maximum of N/2 workstations. For example, a 16 ports 100 Mbps Ethernet switch can have a maximum network bandwidth of 800 Mbps if collisions are ignored. On the other hand, a 16 ports 100 Mbps Ethernet hub can have a maximum network bandwidth of just 100 Mbps. Hence, there is a tremendous improvement in transmission capability for the Ethernet.

As the Ethernet is increased in the number of users, traffic jam becomes a serious problem, particularly at the server. To solve this problem, the Ethernet Switch is designed to provide a load-balancing capability based on user-predefined port group configuration. With this capability, the user or network manager can predefine a port group configuration that can provide an optimal load-balancing operation to the data communication loading on the Ethernet Switch. For instance, assume the Ethernet Switch has 8 ports, the user can predefine Port 1, Port 2, Port 3, and Port 4 in the same group to allow these four ports to share data communication loading on the Ethernet Switch. In other words, if one of the four ports in this group, for example Port 1, has an enormous amount of data communication loading while the other three ports, i.e., Port 2, Port 3, and Port 4, are relatively less loaded, then the Ethernet Switch device will dispatch some of the received data frames, which are originally intended to be transmitted via Port 1, via the other three ports to their destinations. This increases the overall network data communication efficiency through the Ethernet Switch.

One solution of insufficient bandwidth is to combine a number of ports on the Ethernet Switch into a trunk (group) and allow the overall data communication loading in the same trunk to be equally allocated. Presently, the allocation method includes a dynamic allocation method and a static allocation method. The dynamic allocation method allocates data communication loading to each port based on the current loading so that the dynamic allocation method can be performed more data-balancing among the ports. One drawback of the dynamic allocation method, however, is that it can easily cause disordered sequences of frames forwarding. By contrast, the static allocation method allocates data communication loading to all of the ports irrespective of the current loading of each port, and therefore can preserve the sequences of frames forwarding. But the static allocation method would be performed less data balancing among the ports. In the event that the sequences of data frames are disordered, it requires much time and efforts to recover the original ordered sequencing. For this reason, the static allocation method is more preferable than the dynamic allocation method.

On an Ethernet Switch that utilizes the static allocation method, since parity check is performed on the binary address information indicative of the destination, the number of ports in each group should be a 2's power, i.e., $2^N$, where N is the number of bits used in the parity check. Therefore, in the case of 1-bit parity check, each group contains 2 ports ($2^1$=2); in the case of 2-bit parity check, each group contains 4 ports ($2^2$=4); and in the case of 3-bit parity check, each group contains 8 ports ($2^3$=8). For 8-port Ethernet Switch, the 8 ports can be configured depending on the number of parity-check bits, either into 4 groups with each group containing 2 ports; or into 2 groups with each group containing 4 ports; or into a single group containing all the 8 ports. Beside these, other configurations schemes are not allowed. In the case that an Ethernet server is installed with 3 Ethernet cards, and load-balancing capability is desired, the Ethernet Switch device should be configured in such a manner as to allow the group to contain 4 ports. Assume Port 1, Port 2, Port 3, and Port 4 are assigned to the same group, and the 3 Ethernet cards in the server are respectively connected to Port 1, Port 2, and Port 3. In this case, when the load-balancing operation is directed to Port 4, the current data will be unable to be sent out via Port 4 immediately. Instead, the current data will wait until a timeout period is passed, and then can be sent out via another port. This would undoubtedly degrade the overall network data communication efficiency.

SUMMARY OF THE INVENTION

It is therefore an objective of this invention to provide a relay control method and circuit for use in an Ethernet Switch, which allows the ports of the Ethernet Switch to be configured into groups of arbitrary numbers.

It is another objective of this invention to provide a relay control method and circuit for use in an Ethernet Switch, which can overcome drawbacks of the prior art in requiring the number of ports in each group to be a 2's power.

It is still another objective of this invention to provide a relay control method and circuit for use in an Ethernet Switch, which can increase the overall network data communication efficiency through the Ethernet Switch.

In accordance with the foregoing and other objectives, the invention proposes a relay control method and circuit with improved load-balancing capability based on an port group configuration.

The relay control circuit of the invention is designed for use in a Switch device which has a number of ports. The purpose of the relay control circuit is to perform load-balancing in the Switch device based on a port group configuration. The Switch device includes an address-extraction circuit for extracting an address information from a received frame and a memory unit for storing a routing table. The relay control circuit comprises a transformation circuit, a storage unit, and a comparison circuit. The transformation circuit transforms the address information of the received frame into an index address. A target port is determined by looking up the routing table. The storage unit stores the port group configuration which is adjustable. The comparison circuit forwards the received frame according to the index address, the target port and the port group configuration. The port group configuration contains arbitrary number of ports, and is adjusted according to a frame throughput of the ports. In the embodiment of this invention, the port group configuration contains a plurality of certain ports assigned to a port group and a load-balancing relationship between the index address and the certain ports. If the frame throughput of any of the certain ports is overloading, the load-balancing relationship between the index address and the certain ports belonging to the port group can be adjusted in order to balance the load of the certain ports.

The memory unit can be EEPROM or the like, so that the port group configuration data can be permanently stored therein. The address information needs not be a complete binary set of source address plus destination address, and instead can be a truncated version of the source and destination address information. The transformation circuit can be a cyclic redundancy check (CRC) circuit and the index address will be a CRC modulo. The CRC modulo is preferably 8 bits in length, but can also be various other number of bits.

In according with the foregoing and other objectives, the present invention provides a relay control method which is designed for forwarding a frame with an address information in a Switch device. The Switch device has a number of ports and a routing table based on a port group configuration. The relay control method comprises the steps of (1) transforming the address information into an index address; (2) forwarding the frame according to the index address, the routing table, and the port group configuration; (3) adjusting the port group configuration if an over-loading is occurred in the ports. In the embodiment of this invention, the port group configuration includes a plurality of certain ports assigned to a port group and a load-balancing relationship between the index address and the certain ports. If the over-loading is occurred in the certain ports, the load-balancing relationship between the index address and the certain ports belonging to the port group can be adjusted.

The foregoing method and circuit of the invention is more advantageous to use than the prior art in that the number of ports in each group needs not be a 2's power as in the case of the prior art, and instead can be an arbitrary user-selected number no larger than the total number of the ports. Moreover, it can overcome the overall network data communication efficiency through the Ethernet Switch.

BRIEF DESCRIPTION OF DRAWINGS

The invention can be more filly understood by reading the following detailed description of the preferred embodiments, with reference made to the accompanying drawings, wherein.

DETAILED DESCRIPTION OF PREFERRED EMBODIMENTS

Figure 1:
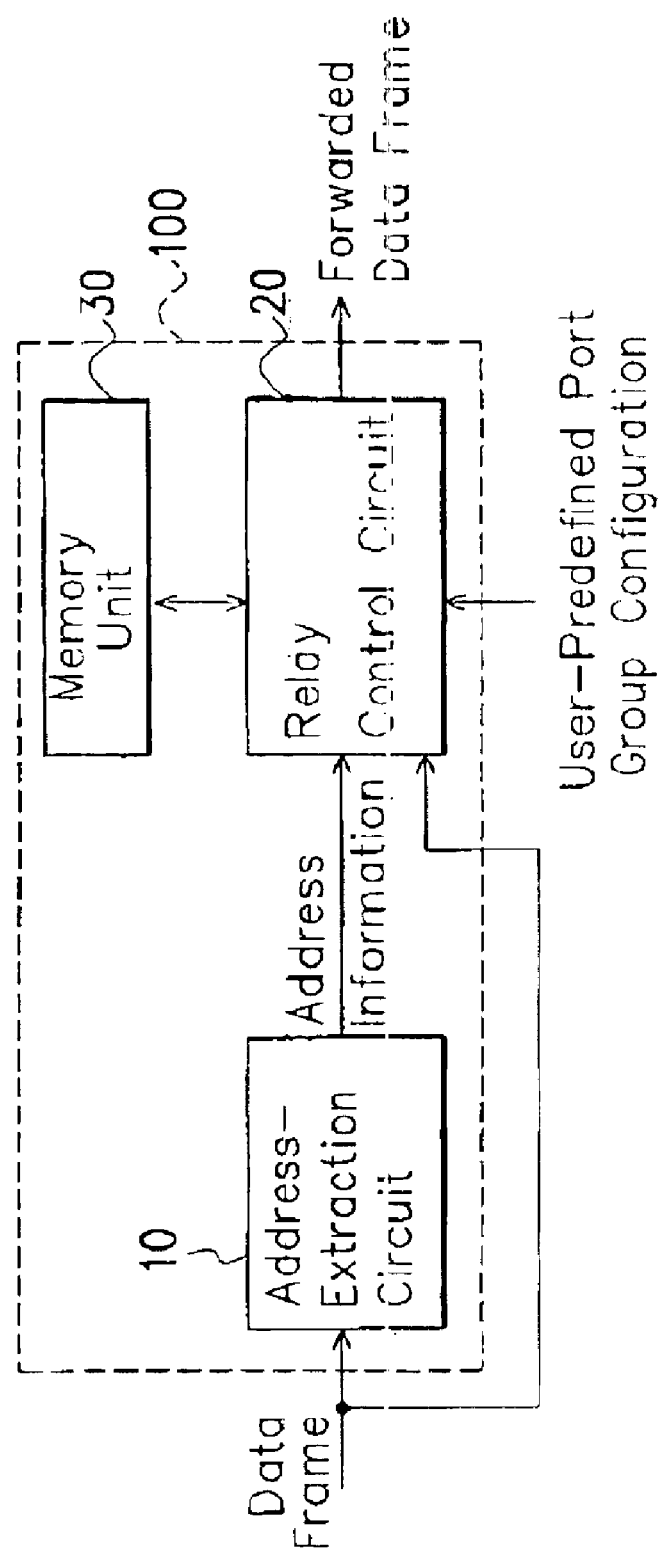
FIG. 1 is a schematic block diagram of an Ethernet Switch incorporating the relay control circuit of the invention.

FIG. 1 is a schematic block diagram of an Ethernet Switch (designated by the reference numeral 100) which utilizes the invention. The Ethernet Switch 100 includes an address-extraction circuit 10, a relay control circuit 20 which is designed in accordance with the invention, and a memory unit 30 such as an EEPROM (Electrically Erasable Programmable Read-Only Memory) unit. The memory unit 30 stores a predefined port-assignment used to determine the target port of each received data frame. With the invention, the Ethernet Switch 100 operates in such a manner that when a data frame is received, the address-extraction circuit 10 extracts the source and destination addresses of the received data frame in binary form and then transfers this binary address information to the relay control circuit 20. The binary address information needs not be a complete binary set of source address plus destination address, and instead can be truncated source and destination address information. The relay control circuit 20 performs multiple-to-one mapping operation function to get a mapping result (index address). The mapping result (index address) is sent to the memory unit 30 to determine the target port of the received data frame. One of the preferred embodiments for performing the multiple-to-one mapping operation function is a CRC (Cyclic Redundancy Check) process. The CRC process is performed on the binary address information to thereby obtain an 8-bit CRC modulo (index address) and then looks up a routing table stored in the memory unit 30 to determine the target port of the received data frame. The CRC modulo is preferably 8 bits in length, but can also be various other number of bits in other embodiments. The relay control circuit then forward the received data frame according to a user-predefined port group configuration. The user-predefined port group configuration includes at least two kinds of information. One defines which ports are in a user-predefined port group; the other describes a load-balancing relationship between the CRC modulo and the certain ports. The target port is compared with the user-predefined port group configuration to determine whether the target port belongs to a user-predefined port group. If YES, the relay control circuit 20 determines a sending port based on the 8-bit CRC modulo and the load-balancing relationship. Then the relay control circuit 20 forwards the received data frame to the sending port. If NOT, the received data frame is forwarded directly via its target port.

For example, it is assumed that there are three ports (Port 1, Port 2 and Port 3) in a user-predefined port group. The 8-bit CRC modulo is divided into 3 ranges, for example 0–85, 86–170, and 171–255. Then the relay control method is performed in such a manner that if the 8-bit CRC modulo is within the range 0–85, the received data frame is forwarded via Port 1 to its destination; if it is within the range 86–170, the received data frame is forwarded via Port 2 to its destination; and if it is within the range 171–255, the received data frame is forwarded via Port 3 to its destination. If data frame throughput of Port 1 is much higher than any other ports (Port 2 & 3) in the group, then the load-balancing relationship between the CRC modulo and the certain ports belonging to the group can be adjusted to that if the 8-bit CRC modulo is within the range 0–50, the received data frame is forwarded via Port 1; if it is within the range 51–152, the received data frame is forwarded via Port 2; and if it is within the range 153–255, the received data frame is forwarded via Port 3. Therefore, some received data frames used to be forwarded via Port 1 (CRC modulo lies within the range 51–85) will be forwarded via Port 2 to reduce the throughput of Port 1. In another word, it helps to balance the loading.

Figure 2:
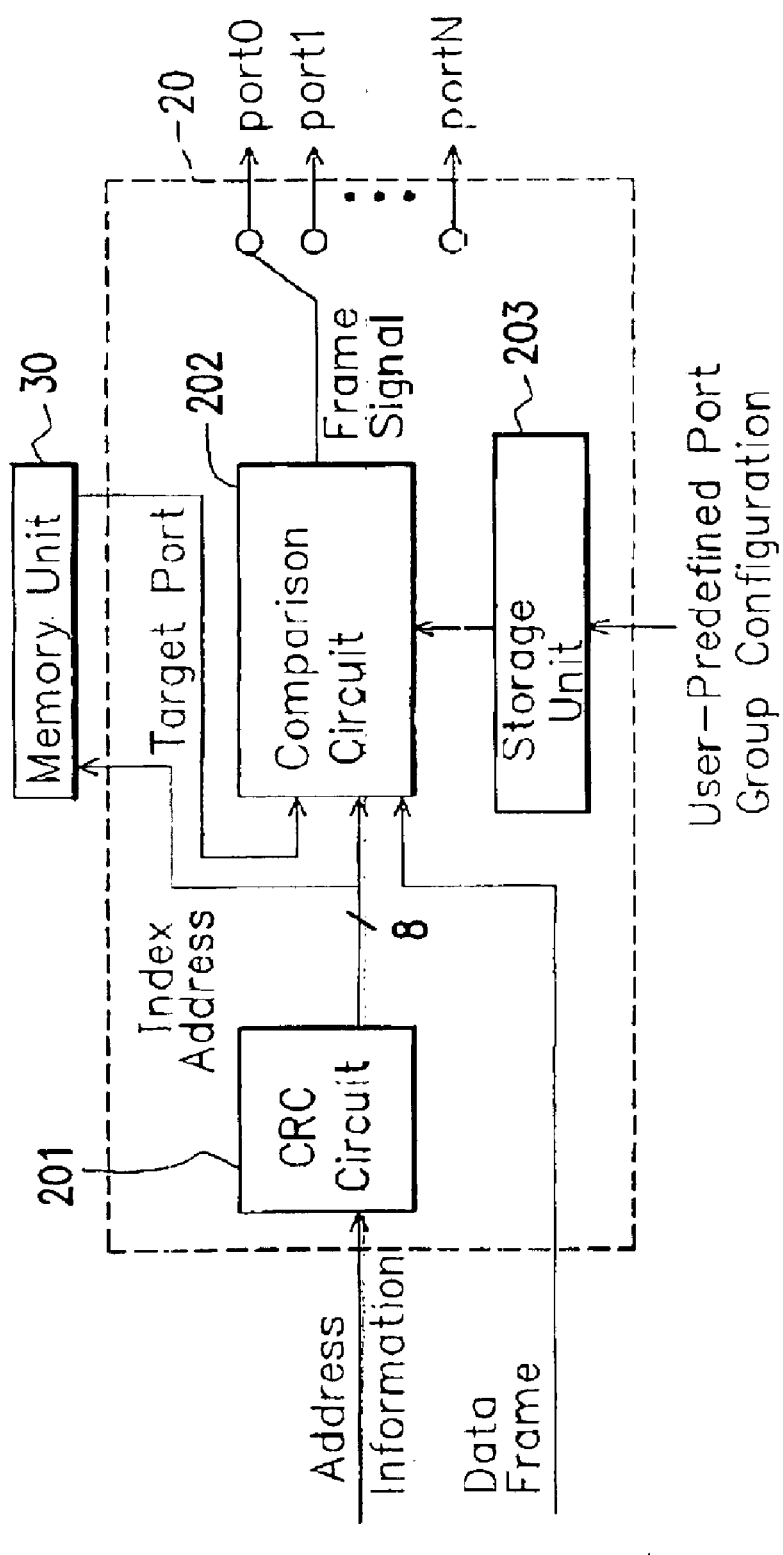
FIG. 2 is a schematic block diagram showing detailed structure of the relay control circuit of the invention.

FIG. 2 is a schematic block diagram showing detailed structure of the relay control circuit 20 shown in FIG. 1. As shown, the relay control circuit 20 includes a CRC circuit 201, a comparison circuit 202, and a storage unit 203 which stores the user-predefined port group configuration. The CRC circuit 201 is capable of performing a CRC process on the received data frame to thereby obtain an 8-bit CRC modulo (index address). This 8-bit CRC modulo (index address) is then transferred to the memory unit 30 to look up the port-assignment table stored in the memory unit 30 for the target port of the received data frame. The target port number is then sent to the comparison circuit 202 where the target port number is compared with the user-specified port configuration stored in the storage unit 203 to determine whether the target port belongs to a user-predefined port group. If YES, the relay control circuit 20 determines the sending port based on the 8-bit CRC modulo and the load-balancing relationship. Then the relay control circuit 20 forwards the received data frame to the sending port. If NOT, the received data frame is forwarded directly via its target port. As described above, the CRC process is one of preferred embodiments for the multiple-to-one mapping operation function. Other process with the same function can also be used in the invention.

Figure 3:
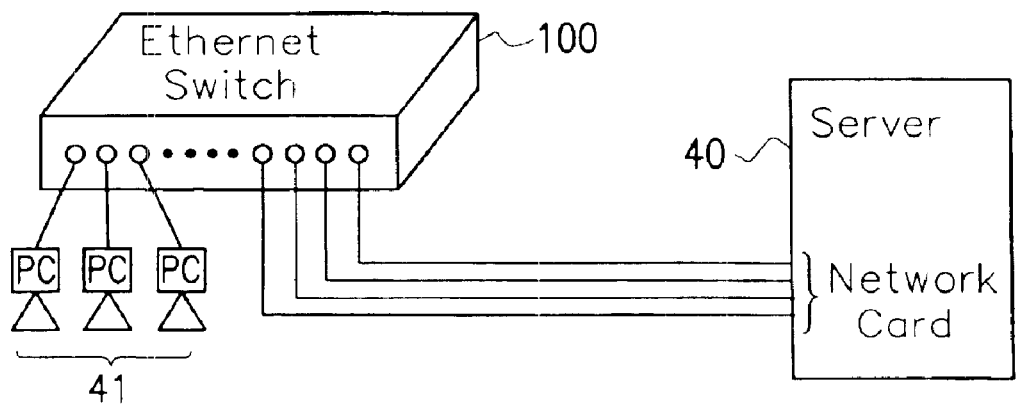
FIG. 3 is a schematic diagram showing the interconnection between an Ethernet server and an Ethernet Switch which utilizes the invention.

FIG. 3 is a schematic diagram showing the interconnection between the Ethernet Switch 100 and an Ethernet server 40. Further, a number of PCs 41 are connected to the Ethernet Switch 100 to access to the server 40. In FIG. 3, it is assumed the server 40 is installed with four network cards (not shown). These four network cards are connected respectively to four ports of the Ethernet Switch 100. These ports and cables constitute a trunk (group) through which data communication can be carried out between the Ethernet Switch 100 and the server 40; and the data communication loading between the Ethernet Switch 100 and the server 40 can be evenly distributed among the ports in this trunk (group), allowing the network data communication efficiency to be increased.

Figure 4:
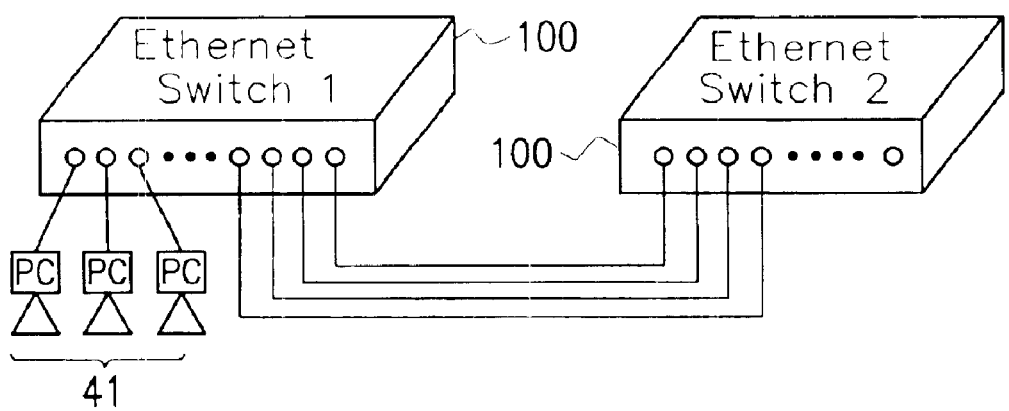
FIG. 4 is a schematic diagram showing the interconnection between two Ethernet Switches both of which utilize the invention.

FIG. 4 is a schematic diagram showing the interconnection between two Ethernet Switch 100 both of which utilize the invention. As shown, the ports and cables used to interconnect these two Ethernet Switches 100 constitute a trunk (group) through which data communication can be carried out between these two Ethernet Switches 100. The data communication loading between the two Ethernet Switches 100 can be evenly distributed among the ports in this trunk (group), allowing the network data communication efficiency to be increased between the two Ethernet Switches 100.

Figure 5:
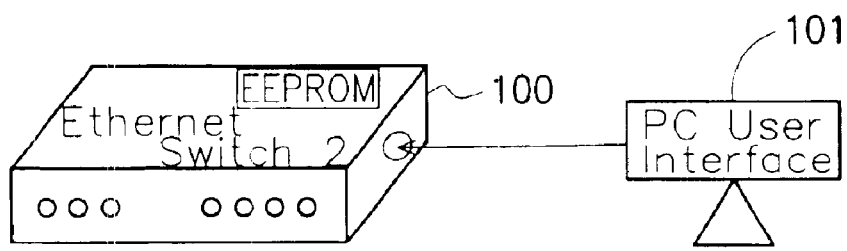
FIG. 5 is a schematic diagram showing the interconnection between a PC user interface and an Ethernet Switching the invention.

FIG. 5 is a schematic diagram showing the interconnection between a PC user interface 101 and an Ethernet Switch device 100 which utilizes the invention. This connection allows the user to set the user-predefined port group configuration in the Ethernet Switch 100 through software means via the PC user interface 101. Alternatively, the user-predefined port group configuration data can be set by using the DIP switch (not shown) or an equivalent circuit in the Ethernet Switch 100.

Figure 6:
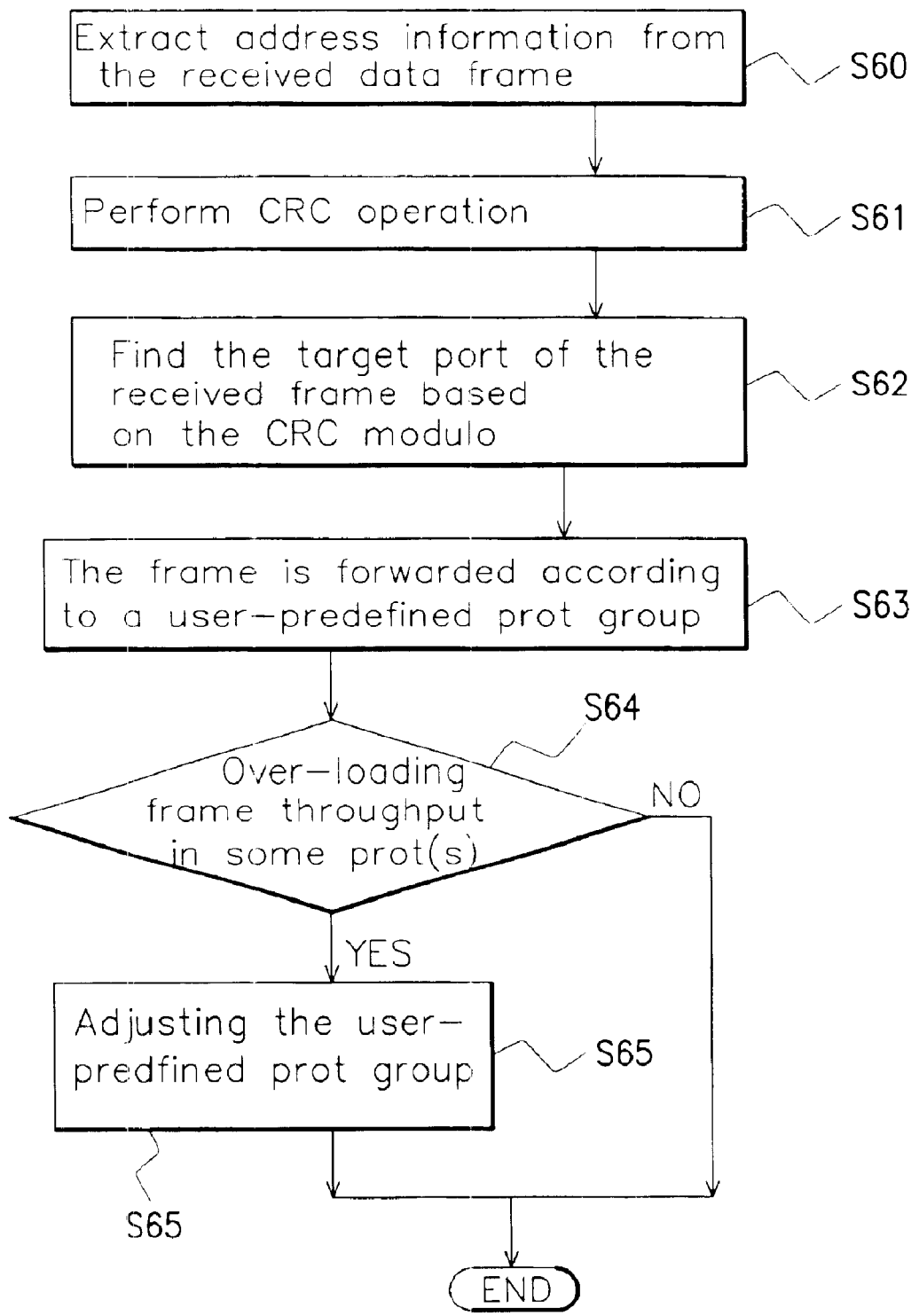
FIG. 6 is a flow diagram showing the load-balancing method of the invention.

FIG. 6 is a flow diagram showing a load-balancing operation based on the user-predefined port group configuration. This procedure is activated whenever a data frame is received from a certain source and forwarded via the Ethernet Switch device to a certain destination.

As shown, in the step S60, an address-extraction process is performed on the received data frame to thereby obtain the source and destination addresses of the frame in binary form.

In the step S61, a CRC operation is performed on the binary address information to thereby obtain an 8-bit CRC modulo.

In the step S62, the port-assignment table is looked up to find the target port of the frame corresponding to the 8-bit CRC modulo.

In the step S63, the received data frame is forwarded according to a user-predefined port group configuration. The user-predefined port group configuration includes at least two kinds of information. One defines which ports are in the same user-predefined port group; the other describes load-balancing relationship between the CRC modulo and the certain ports. If the target port is within the user-predefined port group, a sending port is determined based on the 8-bit CRC modulo and the load-balancing relationship. Then the received data frame is forwarded to the sending port. If the target port is not a port within the user-predefined port group, the received data frame is forwarded directly via its target port.

In the step S64, it is to check if data frame throughput of some ports are overloading in the user-predefined port group.

In the step S65, if the data frame throughput of any port is over-loading, the load-balancing relationship between the CRC modulo and the certain ports belonging to the group is adjusted.

It is to be noted that there is no restriction to the number of ports assigned to the same group. For example, if the total number of ports is 8, then a group can contain from 1 to 8 ports, which can be arbitrarily defined by the user.

In conclusion, the invention provides a relay control method and circuit with an improved load-balancing capability based on user-predefined port group configuration. Compared to the prior art, the invention has the following advantages.

First, by the invention, the number of ports in each group needs not be a 2's power as in the case of the prior art, and instead can be any number no larger than the total number of the ports on the Ethernet Switch. Moreover, the invention can increase the overall network data communication efficiency through the Ethernet Switch. The invention is therefore more advantageous than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A relay control circuit for use in a Switch device having a number of ports, for the purpose of performing load-balancing in the Switch device based on a port group configuration; the Switch device including an address-extraction circuit for extracting an address information from a received frame and a memory unit for storing a routing table;

the relay control circuit comprising:
a transformation circuit for transforming the address information into an index address;
a storage unit for storing the port group configuration which is adjustable; and
a comparison circuit for forwarding the received frame according to the index address and the port group configuration;
wherein the port group configuration contains arbitrary number of ports, and is adjusted according to a frame throughput of the ports.

2. The circuit of claim 1, wherein the port group configuration includes a plurality of certain ports assigned to a port group and a load-balancing relationship between the index address and the certain ports,
adjusting the load-balancing relationship between the index address and the certain ports belonging to the port group if the frame throughput of any of the certain ports is over-loading.

3. The circuit of claim 1, wherein the transformation circuit is a cyclic redundancy check (CRC) circuit and the index address is a CRC modulo.

4. The circuit of claim 3, wherein the CRC modulo is 8 bit in length.

5. The circuit of claim 1, wherein the storage unit is EEPROM.

6. The circuit of claim 1, wherein the port group configuration are set through a DIP switch.

7. A relay control method for forwarding a frame with an address information in a Switch device, the Switch device having a number of ports and a routing table based on a port group configuration;

the method comprising the steps of:
transforming the address information into an index address;
forwarding the frame according to the index address, the routing table, and the port group configuration; and
adjusting the port group configuration if an over-loading is occurred in the ports.

8. The method of claim 7, wherein the step of transforming the address information into the index address is performed by a CRC operation and the index address is a CRC modulo.

9. The method of claim 8, wherein the CRC modulo is 8 bit in length.

10. The method of claim 7, wherein the address information includes the source and destination of the frame.

11. The method of claim 7, wherein the port group configuration includes a plurality of certain ports assigned to a port group and a load-balancing relationship between the index address and the certain ports,
adjusting the load-balancing relationship between the index address and the certain ports belonging to the port group if the over-loading is occurred in the ports.

12. A Switch device for forwarding a frame comprising:
an address-extraction circuit for extracting an address information from the frame;
a memory unit for storing a routing table; and
a relay control circuit, the relay control circuit transforming the address information into an index address, storing a port group configuration, and forwarding the frame according to the index address, the routing table, and the port group configuration,
wherein the port group configuration is adjusted based on the throughput in the Switch device.

13. The Switch device of claim 12 wherein the relay control circuit includes a CRC circuit for transforming the address information into the index address, and the index address is a CRC modulo.

14. The Switch device of claim 13 wherein the CRC modulo is 8 bit in length.

15. The Switch device of claim 12 wherein the relay control circuit further includes:
a storage unit for storing the port group configuration.

16. The Switch device of claim 15 wherein the storage unit is EEPROM.

* * * * *